US008843219B2

(12) United States Patent
Yamada et al.

(10) Patent No.: US 8,843,219 B2
(45) Date of Patent: Sep. 23, 2014

(54) CONTROL DEVICE

(75) Inventors: Akira Yamada, Tokyo (JP); Yuuichi Kumazawa, Tokyo (JP); Tomoya Nakata, Tokyo (JP); Katsumi Morikawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 516 days.

(21) Appl. No.: 13/051,196

(22) Filed: Mar. 18, 2011

(65) Prior Publication Data

US 2011/0246839 A1 Oct. 6, 2011

(30) Foreign Application Priority Data

Mar. 30, 2010 (JP) .................................. 2010-077231

(51) Int. Cl.
G05B 11/01 (2006.01)
G06F 1/14 (2006.01)
G06F 11/16 (2006.01)

(52) U.S. Cl.
CPC .............. *G06F 11/1604* (2013.01); *G06F 1/14* (2013.01); *G06F 11/1608* (2013.01)
USPC .............................. 700/26; 710/260; 713/322

(58) Field of Classification Search
USPC .............................. 700/26; 710/260; 713/322
See application file for complete search history.

(56) References Cited

U.S. PATENT DOCUMENTS 5,048,430 A * 9/1991 Kawai ............................ 110/193
5,479,648 A * 12/1995 Barbera et al. ................. 713/322
6,572,364 B2 6/2003 Kawauchi et al.
2002/0048736 A1 4/2002 Kawauchi et al.
2003/0061425 A1* 3/2003 Kobori ........................... 710/260
2004/0131342 A1* 7/2004 Masino ........................... 388/800
2004/0230323 A1* 11/2004 Glanzer et al. ................... 700/18
2006/0215064 A1* 9/2006 Dawson et al. ............... 348/730
2007/0255935 A1* 11/2007 Agarwala et al. ................ 713/1
2008/0146180 A1 6/2008 Yoda et al.
2010/0023151 A1* 1/2010 Shieh et al. ................... 700/105

FOREIGN PATENT DOCUMENTS

| CN | 101197650 A | 6/2008 |
| CN | 101901176 A | 12/2010 |
| DE | 102008014347 A1 | 1/2009 |
| EP | 0412328 A2 | 2/1991 |
| EP | 0699991 A2 | 3/1996 |
| EP | 1491985 A2 | 12/2004 |
| JP | 8-247455 A | 9/1996 |
| JP | 2002-130670 A | 5/2002 |
| JP | 2008-153910 A | 7/2008 |

OTHER PUBLICATIONS

European Patent Application No. 11160119.1: Extended European Search Report, dated Oct. 7, 2011 (corresponds to the present application).

(Continued)

*Primary Examiner* — Mohammad Ali
*Assistant Examiner* — Anthony Whittington
(74) *Attorney, Agent, or Firm* — Troutman Sanders LLP

(57) ABSTRACT

An RTC, having a crystal oscillator of different characteristics from those of a crystal oscillator, is provided, and the pulse period of the pulse signal from the RTC and the pulse signal based on the crystal oscillator are compared to detect a fault in the crystal oscillator. As a result, even if, for example, located in a high temperature environment, the degrees to the decrease in frequency will be different, thus making it possible to detect reliably a fault in the crystal oscillator.

3 Claims, 4 Drawing Sheets

(56) References Cited

OTHER PUBLICATIONS

Robb, S., "Split Redundant Implementation of Dual Clock Devices", Motorola Technical Developments, vol. 13 (Jul. 1, 1991), p. 91.

Chinese Office Action, dated Apr. 24, 2013, which issued during the prosecution of Chinese Patent Application No. 201110071251.5, which corresponds to the present application.

Japanese Office Action, dated Nov. 12, 2013, which issued during the prosecution of Japanese Patent Application No. 2010-077231.

* cited by examiner

CONTROL DEVICE

CROSS REFERENCE TO RELATED APPLICATIONS

The present application claims priority under 35 U.S.C. §119 to Japanese Patent Application No. 2010-077231, filed Mar. 30, 2010, which is incorporated herein by reference.

FIELD OF TECHNOLOGY

The present invention relates to a control device for controlling combustion in a combustion furnace.

BACKGROUND OF THE INVENTION

Conventionally, in a control device for a combustion furnace, or the like, a combustion sequence is controlled based on a clock signal of a CPU (See, for example, Japanese Unexamined Patent Application Publication H08-247455). In this combustion sequence there are timings that are important to safety, such as the pre-purge timing, the ignition timing, the flame response, and the like. If the clock is changed through, for example, a failure in the clock source for the CPU, the timing of the combustion sequence can be outside of specifications, and non-combusted gases may accumulate or there may be excessive gas flows, beyond the explosive threshold, leading to the risk of explosion. Given this, in recent years there has been a proposal for detecting failures in the clock source by providing redundant clock sources through the provision of two CPUs, to perform mutual monitoring of time data.

However, the crystal oscillators that are typically used as clock sources, if manufactured using identical processes, have extremely similar temperature characteristics and useful life characteristics. Consequently, because the frequency would fall if, for example, placed in a high temperature environment, the frequency would fall by the same amount if placed in the same environment, and so if identical products are used for the redundant clock sources, then identical failures may be produced by identical factors, making it difficult to detect faults.

Given this, the object of the present invention is to provide a control device capable of detecting faults in a clock source more accurately.

SUMMARY OF THE INVENTION

In order to solve the problem set forth above, the control device according to the present invention has a first module including a first central processing unit having a first clock source for producing a periodic first signal, a second central processing unit having a second clock source for outputting a periodic second signal, and a third clock source for outputting a periodic third signal to the first central processing unit and the second central processing unit; wherein:

the first central processing unit detects whether or not a fault has occurred in the first clock source by comparing the first signal and the third signal; and the second central processing unit detects whether or not a fault has occurred in the second clock source through comparing the second signal and the third signal.

Here the first central processing unit may output the first signal to the second central processing unit, and the second central processing unit may detect whether or not a fault has occurred in the first clock source by comparing the first signal and the second signal. Additionally, the control device may be a control device for controlling combustion of a combustion furnace, and when the occurrence of a fault has been detected, the first central processing unit and the second central processing unit may operate so as to stop all combustion in the combustion furnace controlled by the central processing units. Moreover, the third clock source may be structured from a real-time clock.

Additionally, the control device set forth above may further include a second module having a third central processing unit, connected to the first central processing unit, having a fourth clock source for outputting a periodic forth signal; and a fourth central processing unit, connected to the second processing device, having a fifth clock source for outputting a periodic fifth signal; wherein: the third central processing unit the third central processing unit may detect whether or not a fault has occurred by comparing the third signal, inputted through the first central processing unit, and the fourth signal, and the fourth central processing unit may detect whether or not a fault has occurred in the fifth clock source through comparing the third signal, inputted through the second central processing unit, and the fifth signal.

Here the aforementioned control device may be a control device for controlling the combustion of a combustion furnace, where, when a fault has been detected, the third central processing unit and the fourth central processing unit may operate so as to stop all combustion in the combustion furnace controlled by the central processing units.

In an example, the first module can also have an interlock module, and the second module have a burner control module.

The present invention is able to detect failures in the first and second clock sources more accurately through the provision of the third clock source having characteristics that are different from those of the first clock source and the second clock source, where the third clock source outputs the periodic third signal to the first central processing unit and the second central processing unit, where the first central processing unit detects whether or not a fault has occurred in the first clock source through comparing the first signal and the third signal, and the second central processing unit detects whether or not a fault has occurred in the second clock source by comparing the second signal and the third signal.

DETAILED DESCRIPTION. OF THE INVENTION

An example of the present invention will be explained in detail below in reference to the drawings.

Figure 1:
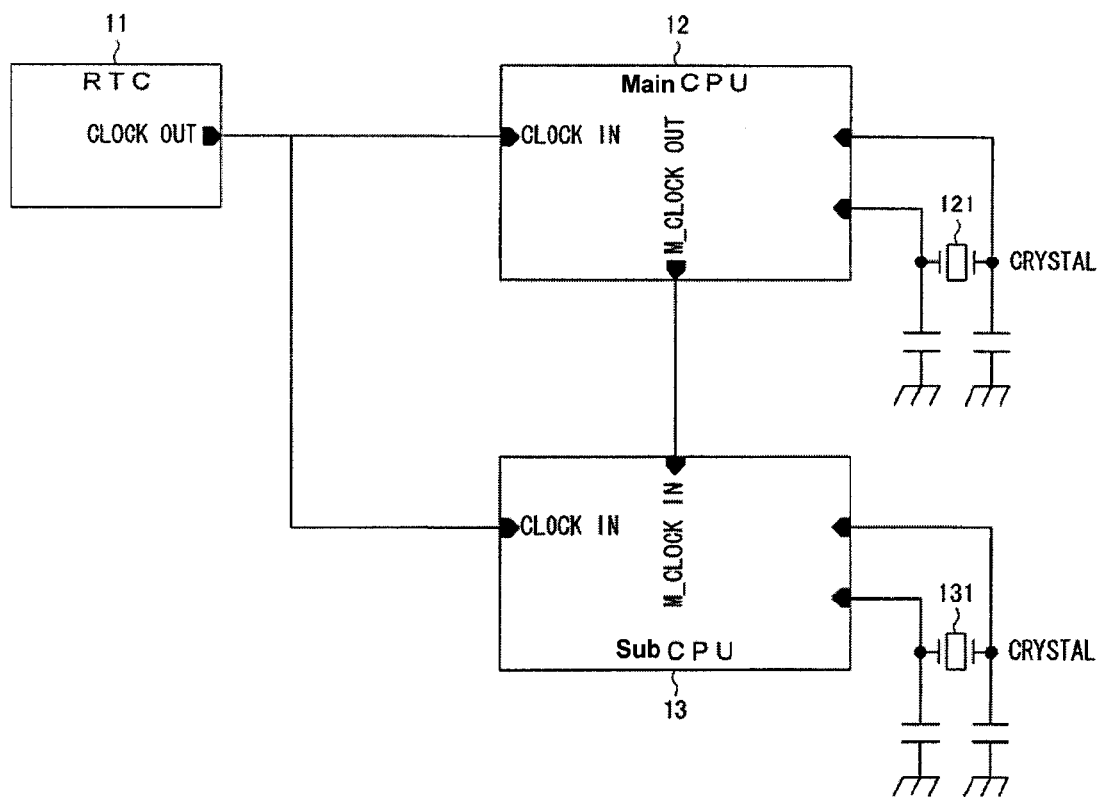
FIG. 1 is a diagram illustrating schematically the structure of an interlock module according to the present invention.

As illustrated in FIG. 1, the interlock module (ILM) 1 according to an example is structured from a real-time clock (RTC) 11, a main CPU 12, and a sub CPU 13.

The RTC 11 is structured from a well-known real-time clock, provided with a built-in clock source (not shown)

structured from a crystal oscillator. This type of RTC outputs a pulse signal (CLOCK) of a specific period to the main CPU 12 and the sub CPU 13.

The main CPU 12 is structured from a well-known processing device to perform a variety of processes, such as a monitoring operation, described below, operations for outputting pulse signals that are used in down-stream equipment such as a control device for a combustion furnace, and the like, using a pulse signal of a specific period that is provided from a crystal oscillator 121, provided externally. This type of main CPU 12 inputs pulse signals from the RTC 11 and the crystal oscillator 12, and outputs, to the sub CPU 13, a pulse signal (M_CLOCK) of a specific period based on the crystal oscillator 121.

The sub CPU 13 is structured from a well-known processing device to perform a variety of processes, such as a monitoring operation, described below, operations for outputting pulse signals that are used in down-stream equipment such as a control device for a combustion furnace, and the like, using a pulse signal of a specific period that is provided from a crystal oscillator 131, provided externally. This type of sub CPU 13 inputs pulse signals from the RTC 11, the main CPU 12 (M_CLOCK), and the crystal oscillator 131.

Here the crystal oscillator of the RTC 11 and the crystal oscillators 121 and 131 of the main CPU 12 and the sub CPU 13 are manufactured through different processes. Consequently, the crystal oscillator of the RTC ii and the crystal oscillators 121 and 131 have mutually differing characteristics.

The monitoring operation in the main CPU 12 will be explained next in reference to FIG. 1 and FIG. 2.

It is assumed that, at the time of startup of the ILM 1, the main CPU 12 outputs, to the sub CPU 13, a pulse signal of a specific period (for example, 14 mS (duty ratio=50%)), and a performs an operation for outputting a pulse signal to a downstream device (not shown). (Step S1)

In such a state, the main CPU 12 checks whether or not a pulse signal is inputted from the RTC 11. (Step S2) This check may be performed continuously, or may be performed at specific intervals.

When the pulse signal is inputted from the RTC 11 (Step S2: YES), the pulse period of this pulse signal and the period of the pulse signal based on the crystal oscillator 121 are compared to check whether or not the mismatch between the two is within a specific range. (Step S3) For example, if the specific pulse period of the pulse signal from the RTC 11 is one second, for example, the check is whether or not the mismatch with the pulse signal based on the crystal oscillator 121 is within the range of one second ±10%.

If the mismatch is within the specific range (Step S3: Yes), then the main CPU 12 returns to the process of Step S1.

On the other hand, if the mismatch is not within the specific range (Step S3: NO), then the main CPU 12 stops all of the operations (lockout). (Step S4)

In this way, in the present example, the RTC 11, having a crystal oscillator of different characteristics from those of the crystal oscillator 121, is provided, and the pulse period of the pulse signal from the RTC 11 and the pulse signal based on the crystal oscillator 121 are compared to detect a fault in the crystal oscillator 121. As a result, even if, for example, located in a high temperature environment, the degrees to the decrease in frequency are different, thus making it possible to detect reliably a fault in the crystal oscillator 121.

Additionally, in this example of embodiment, the main CPU 12 stops all operations when a fault has occurred in the crystal oscillator 121 of the main CPU 12, and thus the output of the pulse signal to the downstream device is stopped as well. Doing so stops the operation of the downstream device as well, thereby preventing the occurrence of faults, and the like, in the downstream device.

The monitoring operation in the sub CPU 13 will be explained next in reference to FIG. 1 and FIG. 3.

It is assumed that, at the time of startup of the ILM 1, the sub CPU 13 outputs, and performs an operation for outputting a pulse signal to a downstream device (not shown). (Step S11)

In such a state, the sub CPU 13 checks whether or not a pulse signal is inputted from the RTC 11 or the main CPU 12. (Step S12) This check may be performed continuously, or may be performed at specific intervals.

When the pulse signal is inputted from the RTC 11 (Step S12: RTC), the pulse period of this pulse signal and the period of the pulse signal based on the crystal oscillator 131 are compared to check whether or not the mismatch between the two is within a specific range. (Step S13) For example, if the specific pulse period of the pulse signal from the RTC 11 is one second, for example, the check is whether or not the mismatch with the pulse signal based on the crystal oscillator 131 is within the range of one second ±10%.

If the mismatch is within the specific range (Step S13: Yes), then the sub CPU 13 returns to the process of Step S11.

On the other hand, if the mismatch is not within the specific range (Step S13: NO), then the sub CPU 13 stops all of the operations (lockout), (Step S14)

On the other hand, when the pulse signal is inputted from the CPU 12 (Step S12: main CPU), the pulse period of this pulse signal and the period of the pulse signal based on the crystal oscillator 131 are compared to check whether or not the mismatch between the two is within a specific range. (Step S15) For example, if the specific pulse period of the pulse signal from the main CPU 12 is 14 msec (duty ratio=50%), for example, the check is whether or not the mismatch with the pulse signal based on the crystal oscillator 131 is within the range of 14 msec±10%.

If the mismatch is within the specific range (Step S13: Yes), then the sub CPU 13 returns to the process of Step S11.

On the other hand, if the mismatch is not within the specific range (Step S15: No), then the sub CPU 13 stops all of the operations (lockout). (Step S14) At this time, all operations of the main CPU 12 may be stopped as well.

In this way, in the present example of embodiment, the RTC 11, having a crystal oscillator of different characteristics from those of the crystal oscillator 131, is provided, and the pulse period of the pulse signal from the RTC 11 and the pulse signal based on the crystal oscillator 131 are compared to detect a fault in the crystal oscillator 131. As a result, even if, for example, located in a high temperature environment, the degrees to which the decrease in frequency will be different, thus making it possible to detect reliably a fault in the crystal oscillator 131.

In addition, in the present, a fault in the crystal oscillator 131 is detected by comparing the pulse period for the pulse signal from the main CPU 12 and the period of the pulse signal based on the crystal oscillator 131, and thus it is possible to detect the faults even when there are simultaneous faults in the RTC 11 and the crystal oscillator 121 or the RTC 11 and the crystal oscillator 131.

Furthermore, in this form, the sub CPU 13 stops all operations when a fault has occurred in the crystal oscillator 131 of at least the main CPU 13, and thus the output of the pulse signal to the downstream device is stopped as well. Doing so stops the operation of the downstream device as well, thereby preventing the occurrence of faults, and the like, in the downstream device.

As described above, the ILM 1, as illustrated in FIG. 4, for example, has a burner control module (BOA) 2 connected downstream. The BCM 2 is be described below.

The BCM 2 is structured from a main CPU 21 and a sub CPU 22.

The main CPU 21 is structured from a processing device for controlling various operations of the combustion furnace, such as turning the burner ON and OFF, using a pulse signal of a specific period, supplied from the crystal oscillator 211, provided externally. This type of main CPU 21 inputs pulse signals from the main 12 of the ILM 1, and outputs, to the sub CPU 22, a pulse signal (M_CLOCK) of a specific period based on the crystal oscillator 211.

Figure 2:
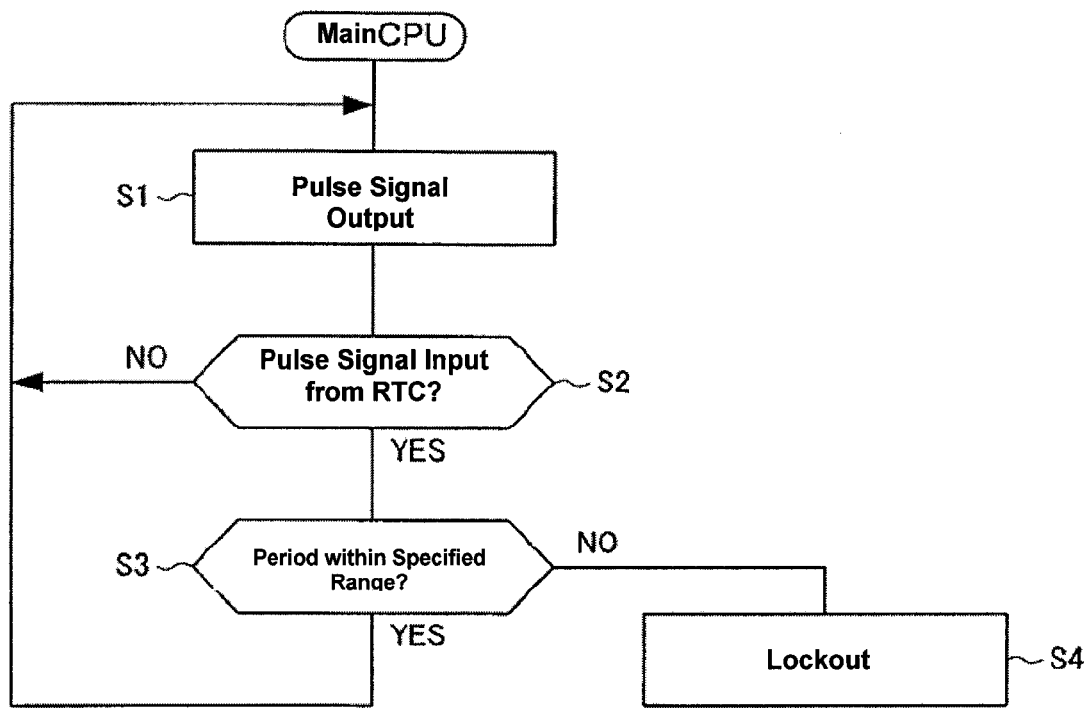
FIG. 2 is a diagram for explaining the operation of the main CPU in the interlock module according to the present invention.

Note that the main CPU 21 performs a monitoring operation identical to that of the main CPU 12 of the ILM 1, explained in reference to FIG. 2. The point of difference from the monitoring operation of the main CPU 12 is the point that the main CPU 21 compares the pulse period of the pulse signal of the RTC 11, inputted through the main CPU 12, and a pulse period based on the crystal oscillator 211. Aside from that, it is identical to that of the main CPU 12.

The sub CPU 22 is structured from a processing device for controlling various operations of the combustion furnace, such as turning the burner ON and OFF, using a pulse signal of a specific period, supplied from the crystal oscillator 221, provided externally. This type of sub CPU 22 inputs pulse signals from the sub CPU 13, the main CPU 21 (M_CLOCK), and the crystal oscillator 221.

Figure 3:
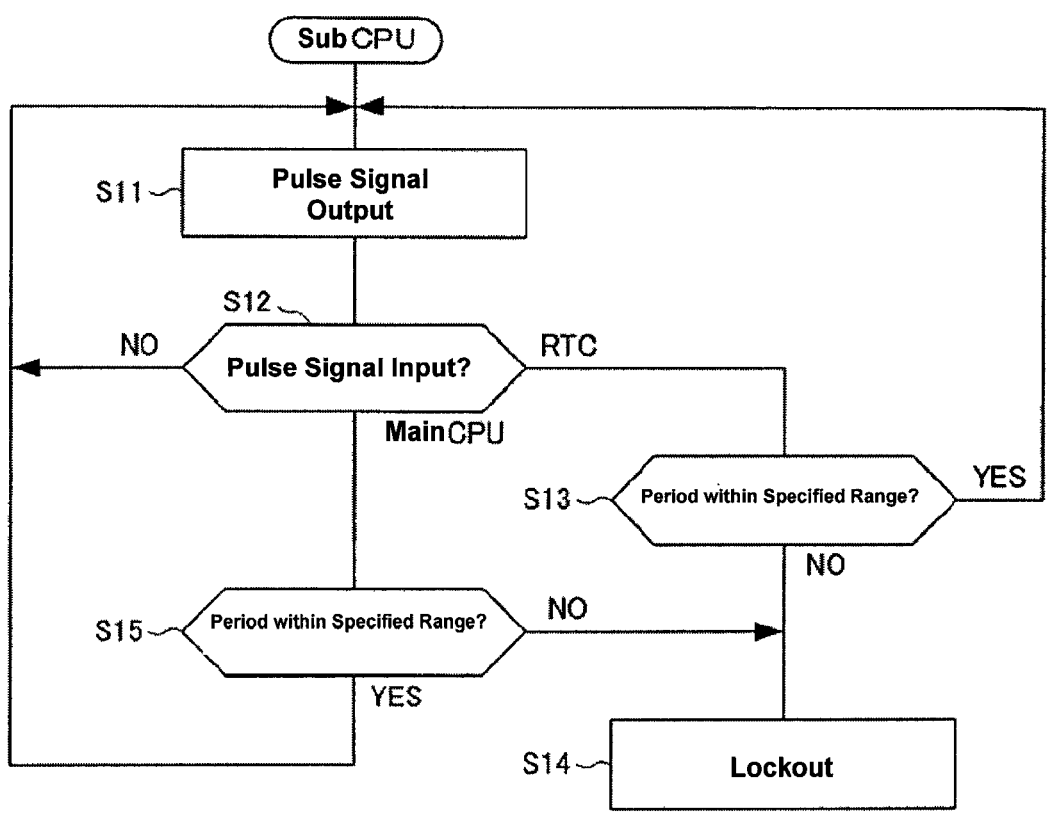
FIG. 3 is a diagram for explaining the operation of a sub CPU in the interlock module according to the present invention.

Note that the sub CPU 22 performs a monitoring operation identical to that of the sub CPU 13 of the ILM 1, explained in reference to FIG. 3. The point of difference from the monitoring operation of the sub CPU 13 is the point that the sub CPU 22 compares the pulse period of the pulse signal of the RTC 11, inputted through the sub CPU 13 or the pulse period of a pulse signal that is inputted from the main CPU 21, and a period of a pulse signal of a crystal oscillator 221. Aside from that, it is identical to that of the sub CPU 13.

In this way, the main CPU 21 of the BCM 2 can provide the same effects in operation as the main CPU 12 of the ILM 1 described above. Similarly, the sub CPU 22 of the BCM 2 is also able to provide the same effects in operation as the sub CPU 13 of the ILM 1, described above.

Figure 4:
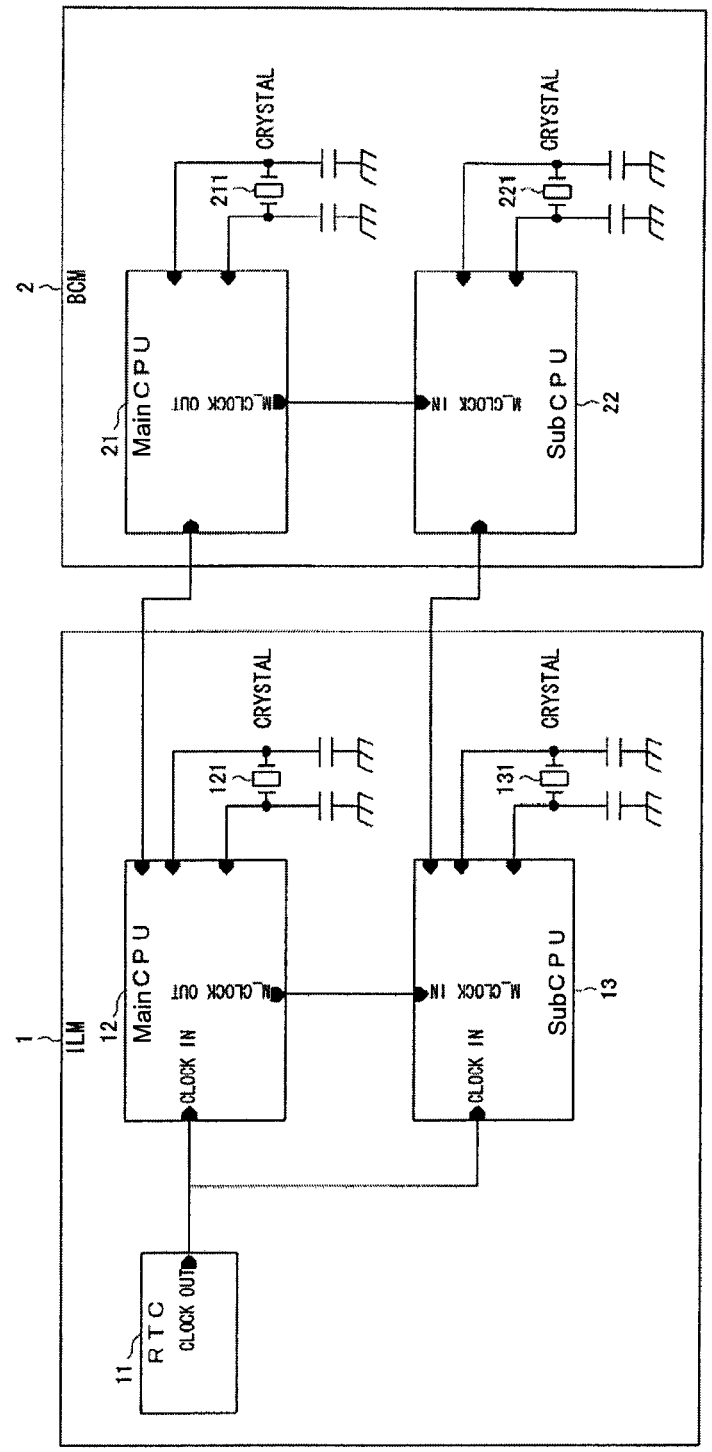
FIG. 4 is a diagram for explaining schematically the structure of the interlock module and a burner control module according to the present invention.

Note that in FIG. 4 the explanation was for an example of a case wherein a single BCM 2 was connected to a single ILM 1; however, instead a plurality of BCMs 2 may be connected to the ILM 1.

In addition, while in the present form of embodiment the explanation was for an example of a case wherein the RTC 11 was used as the clock source for the pulse signal that was outputted to the main CPU 12 and the sub CPU 13, instead it is possible to apply various different clock sources insofar as the clock sources are able to output pulse signals with specific periods. For example, an alternating current power supply may be used as the clock source.

The present invention can be applied to various types of devices provided with interlock structures.

The invention claimed is:
1. A control device comprising:
a first module comprising:
  a first central processing unit having a first clock source for outputting a periodic first signal;
  a second central processing unit having a second clock source for outputting a periodic second signal; and
  a third clock source that has different clock characteristics from the first clock source and the second clock source, for outputting a periodic third signal to the first central processing unit and the second central processing unit; wherein:
the first central processing unit detects whether or not a fault has occurred in the first clock source by comparing the first signal and the third signal;
the second central processing unit detects whether or not a fault has occurred in the second clock source through comparing the second signal and the third signal;
a second module comprising a third central processing unit, connected to the first central processing unit, having a fourth clock source for producing a periodic fourth signal, and a fourth central processing unit, connected to the second central processing unit, having a fifth clock source for outputting a periodic fifth signal;
the third central processing unit detects whether or not a fault has occurred in the fourth clock source by comparing the third signal, inputted through the first central processing unit, and the fourth signal; and
the fourth central processing unit detects whether or not a fault has occurred in the fifth clock source by comparing the third signal, inputted through the second central processing unit, and the fifth signal.
2. The control device as set forth in claim 1, wherein:
the control device is a control device for controlling the combustion of a combustion furnace; and
when the occurrence of a fault is detected, the third central processing unit and the fourth central processing unit stop all combustion of the combustion furnace controlled by the central processing units.
3. The control device as set forth in claim 1, wherein:
the first module comprises an interlock module; and
the second module comprises a burner control module.

* * * * *